United States Patent
Yokoyama et al.

(10) Patent No.: US 12,415,914 B2
(45) Date of Patent: *Sep. 16, 2025

(54) POLYPROPYLENE-BASED RESIN COMPOSITION CONTAINING ULTRAHIGH MOLECULAR WEIGHT PROPYLENE (CO)POLYMER

(71) Applicants: SunAllomer Ltd., Tokyo (JP); SHOWA DENKO K.K., Tokyo (JP)

(72) Inventors: Yutaka Yokoyama, Tokyo (JP); Hiroshi Kajioka, Kanagawa (JP); Akihiro Kamimura, Kanagawa (JP); Shuji Akinaga, Kanagawa (JP)

(73) Assignees: SUNALLOMER LTD., Tokyo (JP); RESONAC CORPORATION, Tokyo (JP)

( * ) Notice: Subject to any disclaimer, the term of this patent is extended or adjusted under 35 U.S.C. 154(b) by 826 days.

This patent is subject to a terminal disclaimer.

(21) Appl. No.: 17/619,426

(22) PCT Filed: Jun. 12, 2020

(86) PCT No.: PCT/JP2020/023196
§ 371 (c)(1),
(2) Date: Dec. 15, 2021

(87) PCT Pub. No.: WO2020/255873
PCT Pub. Date: Dec. 24, 2020

(65) Prior Publication Data
US 2022/0177686 A1   Jun. 9, 2022

(30) Foreign Application Priority Data

Jun. 17, 2019   (JP) ................... 2019-111963

(51) Int. Cl.
| | |
|---|---|
| *C08L 23/16* | (2006.01) |
| *C08F 4/654* | (2006.01) |
| *C08F 4/657* | (2006.01) |
| *C08F 10/06* | (2006.01) |
| *C08L 23/12* | (2006.01) |

(52) U.S. Cl.
CPC .............. *C08L 23/16* (2013.01); *C08F 4/654* (2013.01); *C08F 4/6576* (2013.01); *C08F 10/06* (2013.01); *C08L 23/12* (2013.01); *C08L 2203/14* (2013.01); *C08L 2205/025* (2013.01); *C08L 2205/03* (2013.01)

(58) Field of Classification Search
CPC ...... C08L 23/16; C08L 23/12; C08L 2203/14; C08L 2205/025; C08L 2205/03; C08L 2314/02; C08L 23/14; C08F 4/654; C08F 4/6576; C08F 10/06; C08J 9/0061; C08J 2323/12; C08J 2423/14

See application file for complete search history.

(56) References Cited

U.S. PATENT DOCUMENTS

| | | | |
|---|---|---|---|
| 3,705,123 A | 12/1972 | Mahlman et al. | |
| 6,271,310 B1 | 8/2001 | Okayama et al. | |
| 6,437,048 B1 | 8/2002 | Saito et al. | |
| 8,916,644 B2 | 12/2014 | Tamura et al. | |
| 9,522,984 B2 * | 12/2016 | Kaneno | B29C 51/02 |
| 11,787,882 B2 * | 10/2023 | Otsubo | C08F 4/6421 |
| | | | 526/124.2 |
| 2001/0049425 A1 | 12/2001 | Waymouth et al. | |
| 2006/0116280 A1 | 6/2006 | Yabunouchi et al. | |
| 2009/0155567 A1 | 6/2009 | Sugawara et al. | |
| 2011/0269900 A1 | 11/2011 | Tamura et al. | |
| 2015/0266981 A1 | 9/2015 | Mignogna et al. | |

FOREIGN PATENT DOCUMENTS

| | | |
|---|---|---|
| CN | 1196066 A | 10/1998 |
| CN | 1252825 A | 5/2000 |
| CN | 1735632 A | 2/2006 |
| CN | 101090933 A | 12/2007 |
| CN | 101189269 A | 5/2008 |

(Continued)

OTHER PUBLICATIONS

Anton Paar; Intrinsic viscosity NPL teaching reference (Year: 2020).*
Omnexus; MFR NPL teaching reference (Year: 2024).*
JP 6144045 English Machine Translation (Year: NONE).*
Chinese First Office Action for Chinese Application No. 202080043566. 6, dated Jan. 9, 2023, 11 pages with Translation.
Filiatrault, D. et al., Intrinsic Viscosities and Huggins' Constant for Ethylene-Propylene Copolymers. 2. Effect of the Steric Hindrance of the Solvent on the Solvent Quality. Viscosities in Branched Alkanes, Gycloalkanes, Tetraalkyltin Compounds, cis- and trans-Bicyclo[4.4.0]decane, and Tetrahydronaphthalene, Macromolecules, 1979, vol. 12, No., 1, pp. 69-74.

(Continued)

*Primary Examiner* — Randy P Gulakowski
*Assistant Examiner* — Holley Grace Hester
(74) *Attorney, Agent, or Firm* — Workman Nydegger

(57) ABSTRACT

A polypropylene-based resin composition contains:
  a component (A1) being a propylene homopolymer or a copolymer of propylene and a 30 wt % or less α-olefin having 2 or 4 to 8 carbon atoms, having a intrinsic viscosity of more than 20 dl/g, as measured in a tetralin solvent at 135° C.; and
  a component (A2) being a polymer selected from the group consisting of
  (A2-1) a propylene homopolymer,
  (A2-2) a random copolymer of propylene and an α-olefin having 2 or 4 to 8 carbon atoms,
  (A2-3) a block copolymer of propylene and an α-olefin having 2 or 4 to 8 carbon atoms, and
  a combination of the (A2-1), (A2-2), and (A2-3).
The resin composition has a content of the component (A1) of 0.1 to 10 wt % and a content of the component (A2) of 99.9 to 90 wt % based on the total amount of the component (A1) and the component (A2). The component (A2) has a melt flow rate (MFR) (230° C., load: 2.16 kg) of 1 to 500 g/10 min.

9 Claims, No Drawings

(56) References Cited

FOREIGN PATENT DOCUMENTS

| | | |
|---|---|---|
| CN | 102272208 A | 12/2011 |
| EP | 1813643 A1 | 1/2007 |
| EP | 3985034 A1 | 4/2022 |
| JP | 5-293821 | 11/1993 |
| JP | 6-057055 | 3/1994 |
| JP | 3023382 | 3/2000 |
| JP | 2013-100491 | 5/2013 |
| JP | 5653761 | 11/2014 |
| JP | 5979985 | 8/2016 |
| JP | 6144045 | 6/2017 |
| JP | 6144045 B2 * | 6/2017 |
| WO | WO199720869 | 6/1997 |
| WO | WO2010079799 | 7/2010 |

OTHER PUBLICATIONS

International Preliminary Report on Patentability received for PCT Patent Application No. PCT/JP2020/023195, mailed on Dec. 30, 2021, 12 pages. (7 pages of English Translation and 5 pages of Original Document).

International Search Report and Written Opinion received for PCT Patent Application No. PCT/JP2020/023195, mailed on Aug. 11, 2020, 16 pages. (7 pages of English Translation and 9 pages of Original Document).

International Search Report issued in PCT/JP2020/023195 dated Aug. 11, 2020.

Plastic Age, Mar. 1990, vol. 36, pp. 137-144.

International Search Report issued in PCT/JP2020/023196 dated Aug. 11, 2020.

Machat et al., "Ultrarigid Indenyl-based Hafnocene Complexes for the Highly Isoselective Polymerization of Propene: Tunable Polymerization Performance Adopting Various Sterically Demanding 4-Aryl Substituents," Organometallics, (2017) pp. 399-408.

European Extended Search Report and Opinion for European Application No. 20827414.2, dated May 17, 2023, 8 pages.

European Extended Search Report and Opinion for European Application No. 20826158.6, dated May 17, 2023, 11 pages.

International Preliminary Report on Patentability received for PCT Patent Application No. PCT/JP2020/023196, mailed on Dec. 30, 2021, 10 pages. (6 pages of English Translation and 4 pages of Original Document).

International Search Report and Written Opinion received for PCT Patent Application No. PCT/JP2020/023196, mailed on Aug. 11, 2020, 12 pages. (5 pages of English Translation and 7 pages of Original Document).

Office Action received for Chinese Patent Application No. 202080043566.6, mailed on Jan. 9, 2023, 11 pages (5 pages of English Translation and 6 pages of Original Document).

Office Action received for Chinese Patent Application No. 202080043574, mailed on Nov. 22, 2022, 16 pages (8 pages of English Translation and 8 pages of Original Document).

* cited by examiner

POLYPROPYLENE-BASED RESIN COMPOSITION CONTAINING ULTRAHIGH MOLECULAR WEIGHT PROPYLENE (CO)POLYMER

TECHNICAL FIELD

The present invention relates to a polypropylene-based resin composition containing an ultrahigh molecular weight propylene (co)polymer.

BACKGROUND ART

A high molecular weight propylene polymer is useful as a resin component particularly for an extrusion molded body (general sheet, foamed sheet, blow molded article, etc.), and various studies have been made so far on production of the high molecular weight propylene polymer. For example, PTL 1 discloses a crosslinked ultrahigh molecular weight olefin-based polymer having a intrinsic viscosity [η] of 5 to 50 dl/g, as measured in a decalin solvent at 135° C. However, the olefin-based polymers specifically disclosed in the examples is only polyethylene. PTL 2 discloses an ultrahigh molecular weight propylene homopolymer having a intrinsic viscosity [η] of 7 dl/g or more and less than 25 dl/g, as measured using a decalin solution. Examples of this literature disclose a propylene polymer having [η] of 20.2 dl/g. PTL 3 discloses an ultrahigh molecular weight polypropylene having a intrinsic viscosity [η] of at least 5 dl/g or more, as measured using a decalin solution. Examples of this literature disclose polypropylene having [η] of 20.25 dl/g. PTL 4 discloses polypropylene having a intrinsic viscosity [η] of 5 to 20 dl/g, as measured in a tetrahydronaphthalene (tetralin) solvent at 135° C. PTL 5 discloses a foam formed from a resin composition containing a propylene (co)polymer having an intrinsic viscosity [η] of 5 to 20 dl/g, as measured in a decalin solvent at 135° C. (claims and paragraph 0018). However, the intrinsic viscosity of the propylene (co)polymer specifically disclosed in PTL 5 is 3.8 to 14.8 dl/g (table 1).

CITATION LIST

Patent Literature

PTL 1: JP 5979985 B2
PTL 2: JP 5653761 B2
PTL 3: JP 3023382 B2
PTL 4: JP 6144045 B2
PTL 5: JP 2013-100491 A

SUMMARY OF INVENTION

Technical Problem

PTL 1 does not specifically disclose a propylene polymer having a high [η]. PTLs 2 and 3 disclose propylene polymers having [η] of about 20 dl/g, but the viscosities are values measured using decalin as a solvent. When a value of [η] measured using decalin as a solvent is converted into a value measured using tetralin as a solvent, it is obvious to those skilled in the art that the converted value is lower. Therefore, when values of [η] described in PTLs 2 and 3 are converted into values measured using tetralin as a solvent, the converted values are less than 20 dl/g. Similarly, when the intrinsic viscosity described in PTL 5 is converted into a value measured using tetralin as a solvent, the converted intrinsic viscosity is further lower than the original value. From the above, a composition containing an ultrahigh molecular weight propylene polymer having a [η] of more than 20 dl/g, as measured using tetralin as a solvent, has not been reported so far. In view of such circumstances, an object of the present invention is to provide a composition containing an ultrahigh molecular weight propylene polymer.

Solution to Problem

The inventors have found that a composition containing an ultrahigh molecular weight polypropylene-based polymer can be produced by optimizing a polymerization catalyst and polymerization conditions, and have completed the present invention. That is, the above problem is solved by the following present invention.

[1] A polypropylene-based resin composition containing:
a component (A1) being a propylene homopolymer or a copolymer of propylene and a 30 wt % or less α-olefin having 2 or 4 to 8 carbon atoms, having a intrinsic viscosity of more than 20 dl/g, as measured in a tetralin solvent at 135° C.; and
a component (A2) being a polymer selected from the group consisting of
(A2-1) a propylene homopolymer,
(A2-2) a random copolymer of propylene and an α-olefin having 2 or 4 to 8 carbon atoms,
(A2-3) a block copolymer of propylene and an α-olefin having 2 or 4 to 8 carbon atoms, and
a combination of the (A2-1), (A2-2), and (A2-3),
and having a content of the component (A1) of 0.1 to 10 wt % and a content of the component (A2) of 99.9 to 90 wt % based on the total amount of the component (A1) and the component (A2), and
the component (A2) having a melt flow rate (MFR) (230° C., load: 2.16 kg) of 1 to 500 g/10 min.
[2] The resin composition according to [1], in which the α-olefin in the component (A1) is ethylene.
[3] The resin composition according to [2], in which the component (A1) has a value of the intrinsic viscosity of 23 dl/g or more and a content of the ethylene of 3 to 30 wt %.
[4] The resin composition according to [2] or [3], in which the component (A1) is a propylene-ethylene copolymer having a melting point determined using a differential scanning calorimeter (DSC) at a heating rate of 10° C./min, and the melting point, Tm (° C.), of the propylene-ethylene copolymer and the content of the ethylene in the propylene-ethylene copolymer, C2 (wt %), satisfy formula (1) below:

$$Tm \geq -3.4 \times C2 + 162 \qquad (1)$$

[5] A method for producing the resin composition according to any one of [1] to [4], including the polymerization of a corresponding monomer using a catalyst to prepare the component (A1),
in which the catalyst contains:
(a) a solid catalyst containing magnesium, titanium, halogen, and an electron donor compound as essential components;
(b) an organoaluminum compound; and
(c) an external electron donor compound as necessary.
[6] The resin composition according to any one of [1] to [4], the resin composition being obtained by a production method including the polymerization of one or more monomers corresponding to the components (A1) and (A2) in two or more polymerization stages carried out sequentially or continuously.

[7] The resin composition according to [6], in which a process of polymerizing a monomer corresponding to the component (A1) includes a pre-polymerization process.
[8] The resin composition according to any one of [1] to [4], [6], and [7], the resin composition having an MFR (230° C., load: 2.16 kg) of 1 to 20 g/10 min.
[9] The resin composition according to any one of [1] to [4] and [6] to [8], the resin composition having a melt tension (200° C., diameter: 2.095 mm) of 2.5 to 30 g-weight.
[10] A foam formed from the resin composition according to any one of [1] to [4] and [6] to [9].

Advantageous Effects of Invention

According to the present invention, a composition containing an ultrahigh molecular weight propylene polymer can be provided.

DESCRIPTION OF EMBODIMENTS

Hereinafter, the present invention will be described in detail. In the present invention, "X to Y" include the end values X and Y.
1. Composition
1-1. Component (A1)
(1) Intrinsic Viscosity
The polypropylene-based resin composition of the present invention (hereinafter, it is also simply referred to as "composition of the present invention") contains a propylene homopolymer or a copolymer of propylene and a 30 wt % or less α-olefin having 2 or 4 to 8 carbon atoms as a component (A1). The intrinsic viscosity of the component (A1) measured in tetralin solvent at 135° C. is more than 20 dl/g. The intrinsic viscosity is an indicator of molecular weight, and the component (A1) has an unconventionally and extremely high molecular weight. Because the resin composition containing the propylene (co)polymer having the high intrinsic viscosity has also a high melt tension, the composition of the present invention provides, for example, an excellent foam. From the above viewpoint, the lower limit of the intrinsic viscosity is preferably 23 dl/g or more. From the viewpoint of ease of production, the upper limit of the intrinsic viscosity is preferably 50 dl/g or less.
(2) Comonomer Amount
When the component (A1) is a copolymer, the amount of a comonomer is 30 wt % or less. When the amount of the comonomer exceeds this value, the crystallinity of the copolymer decreases and the powder properties of the polymer deteriorate, so that the production becomes difficult. From the above viewpoint, the upper limit of the amount of the comonomer is preferably 25 wt % or less. On the other hand, the lower limit of the amount of the comonomer is not limited, and is preferably 3 wt % or more, and more preferably 5 wt % or more. In the present invention, the amount of the comonomer is the amount of units derived from the relevant monomer in the copolymer. The comonomer includes α-olefin having 2 or 4 to 8 carbon atoms. Among them, an α-olefin having 2 carbon atoms, that is, ethylene is preferable as the comonomer from the viewpoint of reactivity. By copolymerizing ethylene, the intrinsic viscosity of the propylene polymer can be further increased. Therefore, in one aspect, the component (A1) is a copolymer in which the intrinsic viscosity is 23 dl/g or more and the content of ethylene (content percentage of ethylene-derived units) is 3 to 30 wt %.

(3) XI
The component (A1) has a xylene-insoluble fraction (XI) of preferably 40 wt % or more, more preferably 50 wt % or more, still more preferably 60 wt % or more, and particularly preferably 70 wt % or more. The XI is a crystalline component in the propylene (co)polymer. The upper limit of the XI is not particularly limited.
(4) Melting Point
The Component (A1) has a melting point (Tm) of preferably 100° C. or higher, more preferably 120° C. or higher, still more preferably 140° C. or higher, and particularly preferably 150° C. or higher. The melting point is a temperature at which the heat of fusion associated with melting observed by second scanning using a differential scanning calorimeter (DSC) exhibits a maximum value. The second scanning means that a sample (resin) is heated and melted, then cooled to be crystallized, held at room temperature for 5 minutes, and then subjected to second heating to perform thermal analysis. Specifically, the sample is heated to a melting temperature or higher (230° C.), held at the temperature for 5 minutes, cooled to 30° C. at a cooling rate of 10° C./min, held for 5 minutes, and then heated to 230° C. at a heating rate of 10° C./min to perform thermal analysis.
The component (A1) has a characteristic of having a high melting point compared with a conventional copolymer having the same type and content percentage of a comonomer as those of the component (A1). Particularly, when the component (A1) is a propylene-ethylene copolymer, the above-described Tm (° C.) and the content percentage of the ethylene-derived units in the copolymer, C2 (wt %), preferably satisfy formula (1).

$$Tm \geq -3.4 \times C2 + 162 \qquad \text{Formula (1):}$$

1-2. Component (A2)
The composition of the present invention contains a polymer having a melt flow rate (MFR) (230° C., load: 2.16 kg) of 1 to 500 g/10 min as a component (A2). The MFR is measured in accordance with JIS K7210-1 under conditions of a temperature of 230° C. and a load of 2.16 kg. If the MFR exceeds the above-mentioned upper limit value, the dispersion of the component (A2) is poor, and if the MFR is less than the above-mentioned lower limit value, the melt fluidity is insufficient. From the above viewpoint, the upper limit of the MFR is preferably 100 g/10 min or less, and the lower limit is preferably 5 g/10 min or more. The MFR of the component (A1) cannot be measured.
The component (A2) is selected from the group consisting of a propylene homopolymer (component (A2-1)), a random copolymer of propylene and an α-olefin having 2 or 4 to 8 carbon atoms (component (A2-2)), a block copolymer of propylene and an α-olefin having 2 or 4 to 8 carbon atoms (component (A2-3)), and a combination thereof.
As the component (A2-1), a known propylene homopolymer can be used. As the component (A2-2), a random copolymer (RACO) of propylene and ethylene is preferable from the viewpoint of productivity. In addition, from the viewpoint of rigidity and heat resistance, the content of the α-olefin is preferably 5 wt % or less in the component (A2-2).
As the component (A2-3), a polymerization mixture (HECO) obtained by copolymerizing propylene or the α-olefin in the presence of a propylene polymer is provided. From the viewpoint of productivity, ethylene is preferable as the α-olefin (comonomer). From the viewpoint of stable production, the content of the α-olefin is preferably 40 wt % or less in the component (A2-3). The lower limit thereof is not limited, but is preferably 5 wt % or more from the viewpoint of imparting impact resistance.

The component (A2) may be a combination of two or more of the component (A2-1), the component (A2-2), and the component (A2-3). The proportion of the components in this case is not limited, but the components are preferably blended so that the amount of the comonomer is 40 wt % or less in the component (A2).

1-3. Composition (1) Proportions of Component (A1) and Component (A2)

As for the component (A1) and the component (A2), the content of the component (A1) is 0.1 to 10 wt %, and the content of the component (A2) is 99.9 to 90 wt % based on the total amount of both components. The composition can be appropriately prepared according to its application, but the upper limit of the content of the component (A1) is preferably 8 wt % or less, and more preferably 6 wt % or less from the viewpoint of ease of production and the like; the lower limit is preferably 0.2 wt % or more, more preferably 0.5 wt % or more, and still more preferably 1 wt % or more. If the percentage of the component (A1) is less than 0.1 wt %, it is difficult to obtain the effect caused by the component (A1), and if the percentage exceeds 10 wt %, the fluidity of the composition may be deteriorated.

(2) Other Components

To the composition of the present invention, conventional additives commonly used for olefin polymers may be added, such as a foaming agent, antioxidant, chlorine catcher, heat stabilizer, light stabilizer, ultraviolet absorber, internal lubricant, external lubricant, antiblocking agent, antistatic agent, antifogging agent, crystal nucleating agent, flame retardant, dispersant, copper inhibitor, neutralizing agent, plasticizer, crosslinking agent, peroxide, extender oil, and other organic and inorganic pigments. The addition amount of each additive may be a known amount. The foaming agent will be described later.

In addition, the resin composition of the present invention may contain a thermoplastic elastomer such as an olefin-based elastomer, a styrene-based elastomer, a vinyl chloride-based elastomer, a urethane-based elastomer, an ester-based elastomer, or an amide-based elastomer, to the extent that the effect of the present invention is not impaired. The thermoplastic elastomer may be used singly or in combination of two or more thereof.

When the thermoplastic elastomer is contained, the content thereof may be a known amount, but is preferably 0.1 to 30 parts by weight and more preferably 1 to 20 parts by weight with respect to 100 parts by weight of the total of the component (A1) and the component (A2) (hereinafter, also referred to as "resin component").

Further, the composition of the present invention may contain a filler as necessary, to the extent that the effect of the present invention is not impaired. The filler is mainly added for the purpose of improving the rigidity of a molded article. Examples of the filler include inorganic fillers such as talc, clay, calcium carbonate, magnesium hydroxide, and glass fiber, and organic fillers such as carbon fiber and cellulose fiber. These fillers may be used singly or in combination of two or more thereof. In order to improve the dispersibility of the filler, surface treatment of the filler or preparation of a master batch of the filler and the resin may be performed as necessary. Among the fillers, talc is preferable because it is easily mixed with the polypropylene-based resin and the rigidity of the molded article is easily improved. The addition amount of the filler may be a known amount. For example, the amount may be 0.1 to 40 parts by weight with respect to 100 parts by weight of the resin component.

1-4. Physical Properties (1) MFR

The MFR of the resin composition of the present invention (230° C., load: 2.16 kg) is preferably 1 to 20 g/10 min, and more preferably 2 to 15 g/10 min.

(2) Melt Tension

From the viewpoint of suppressing cell breakage during foaming and maintaining the appearance of a foam while maintaining the closed cell property of the foam, the lower limit of the melt tension of the resin composition of the present invention is preferably 2.5 g-weight or more, more preferably 4.0 g-weight or more, and still more preferably 5.0 g-weight. Since the preferred upper limit of the intrinsic viscosity is 50 dl/g or less, the upper limit of the melt tension is preferably 30 g-weight or less from the viewpoint of ease of production. In general, in a polypropylene-based resin composition, the melt tension decreases as the MFR increases, but when the balance between the MFR and the melt tension is within a specific range, the foaming ability of the polypropylene-based resin composition is improved. For the balance between the MFR and the melt tension, the product of log (MFR+1) and log (MT) being used MFR (230° C., load: 2.16 kg, unit: g/10 min) and melt tension (MT) (200° C., diameter: 2.095 mm, unit: g-weight) can be an indicator. In the present invention, the product of log (MFR+1) and log (MT) is preferably 0.40 or more, more preferably 0.45 or more, and still more preferably 0.50 or more. In the present invention, the melt tension is a tension when the composition of the present invention is extruded from an orifice having a diameter of 2.095 mm at a rate of 15 mm/min at 200° C. and a strand of the molten composition is taken up at a rate of 6.5 m/min.

2. Production Methods

The composition of the present invention can be produced by a known method such as melt kneading, solution blending, or polymerization blending by multistage polymerization of the component (A1) and the component (A2). Further, the composition can also be used as a master batch and combined with another polyolefin to produce a secondary composition.

Preferably, the composition of the present invention is produced by the following method.

Method 1: a method including polymerizing one or more monomers corresponding to the components (A1) and (A2) in two or more polymerization stages carried out sequentially or continuously.

Method 2: a method of preparing a composition containing the component (A1) at a high concentration, which is used similarly to a masterbatch, and diluting the composition with the component (A2).

Method 3: a method of separately preparing the component (A1) and the component (A2), and mixing them.

Method 4: a method of preparing the component (A1) and the component (A2) by polymerization and then mixing using a polymerization reactor in which a gradient in monomer concentration or polymerization conditions exists (as an example, a method described in Japanese Translation of PCT International Application Publication No. 2002-520426).

In the present invention, the methods 1 to 3 are more preferable and will be described below.

2-1. Production Method Including Two Polymerization Processes (Method 1)

This method includes polymerizing one or more monomers corresponding to the components (A1) and (A2) in two or more polymerization stages carried out sequentially or continuously. In particular, a method is preferable in which one or more raw material monomers for the component (A)

are polymerized to produce a polymer of the component (A1), and in the presence of the polymer, one or more raw material monomers for the component (A2) are polymerized. The polymerization can be carried out in a liquid phase, in a gas phase, or in a liquid-gas phase. A conventional molecular weight regulator known in the art, such as a chain transfer agent (e.g., hydrogen or $ZnEt_2$), may be used.

In particular, the above method preferably includes a pre-polymerization process as one of the reaction stages. The pre-polymerization is a process of forming a polymer chain on a solid catalyst component, as a foothold for subsequent main polymerization of one or more raw material monomers. The pre-polymerization can be performed by a known method. The pre-polymerization is usually performed at 40° C. or lower, preferably 30° C. or lower, and more preferably 20° C. or lower. The pre-polymerized catalyst (pre-polymerization catalyst) is introduced into a polymerization reaction system and subjected to main polymerization of one or more raw material monomers. In the present invention, the component (A1) having an ultrahigh molecular weight is synthesized in the pre-polymerization stage, and the component (A2) can be prepared by main polymerization using the pre-polymerization catalyst. By such polymerization, dispersibility of the component (A1) in the component (A2) can be improved.

The main polymerization may be carried out by introducing one or more monomers at a time or at different times. One or more monomers to be subjected to the main polymerization are usually one or more monomers corresponding to the component (A1) and the component (A2). However, when the component (A1) is obtained by the pre-polymerization as described above, only one or more monomers corresponding to the component (A2) can be subjected to the main polymerization. The polymerization may be carried out in a liquid phase, in a gas phase, or in a liquid-gas phase. The polymerization temperature is preferably 0 to 90° C., and more preferably 20 to 80° C. The polymerization pressure is preferably in the range of 0.8 to 6.0 MPa for the polymerization performed in a liquid phase, and preferably in the range of 0.5 to 3.0 MPa for the polymerization performed in a gas phase. A conventional molecular weight regulator known in the art, such as a chain transfer agent (e.g., hydrogen or $ZnEt_2$), can be used in a very small amount.

Any catalyst can be used for the polymerization for the component (A2). On the other hand, for the polymerization for the component (A1), it is preferable to use a catalyst containing (a) a solid catalyst containing magnesium, titanium, halogen, and an electron donor compound as essential components, (b) organoaluminum compound, and as necessary, (c) an external electron donor compound, in order to obtain an ultrahigh molecular weight polymer. The catalyst will be described later.

2-2. Method for Diluting Composition with High Concentration of Component (A1) (Method 2)

The composition of the present invention can also be obtained by preparing a composition containing the component (A1) at a high concentration by the method described above, which is used similarly to a masterbatch, and diluting the composition with the component (A2). In the composition containing the component (A1) at a high concentration, the content of the component (A1) may be in the range of 0.1 to 10 wt % or in an amount exceeding the upper limit of this range. However, the content of the component (A1) in the composition obtained by dilution is 0.1 to 10 wt %. As a dilution method, a known method can be used, such as dry blending or melt-kneading in an extruder of both the composition containing the component (A1) and component (A2).

[Catalyst]

(1) Solid Catalyst (Component (a))

A component (a) can be prepared by a known method of, for example, bringing a magnesium compound, a titanium compound, and an electron donor compound into mutual contact. As the titanium compound used for the preparation of the component (a), a tetravalent titanium compound represented by the general formula: $Ti(OR)_gX_{4-g}$ is suitable. In the formula, R is a hydrocarbon group, X is halogen, and $0 \leq g \leq 4$. Specific examples of the titanium compound include titanium tetrahalide such as $TiCl_4$, $TiBr_4$, and $TiI_4$; alkoxytitanium trihalide such as $Ti(OCH_3)Cl_3$, $Ti(OC_2H_5)Cl_3$, $Ti(O_n-C_4H_9)Cl_3$, $Ti(OC_2H_5)Br_3$, and $Ti(OisoC_4H_9)Br_3$; alkoxytitanium dihalide such as $Ti(OCH_3)_2Cl_2$, $Ti(OC_2H_5)_2Cl_2$, $Ti(O_n-C_4H_9)_2Cl_2$, and $Ti(OC_2H_5)_2Br_2$; trialkoxytitanium monohalide such as $Ti(OCH_3)_3Cl$, $Ti(OC_2H_5)_3Cl$, $Ti(O_n-C_4H_9)_3Cl$, and $Ti(OC_2H_5)_3Br$; and tetraalkoxytitanium such as $Ti(OCH_3)_4$, $Ti(OC_2H_5)_4$, and $Ti(O_n-C_4H_9)_4$. Among these titanium compounds, a halogen-containing titanium compound, particularly titanium tetrahalide is preferable, and titanium tetrachloride is particularly preferable.

Examples of the magnesium compound include magnesium compounds having a magnesium-carbon bond or a magnesium-hydrogen bond, such as dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, and butylmagnesium hydride. These magnesium compounds can be used, for example, in the form of a complex compound with organoaluminum or the like, and may be liquid or solid. Further, examples of a suitable magnesium compound include magnesium halides such as magnesium chloride, magnesium bromide, magnesium iodide and magnesium fluoride; aryloxymagnesium halides such as methoxymagnesium chloride, ethoxymagnesium chloride, isopropoxymagnesium chloride, butoxymagnesium chloride, and octoxymagnesium chloride; allyloxymagnesium halides such as phenoxymagnesium chloride and methylphenoxymagnesium chloride; alkoxymagnesiums such as ethoxymagnesium, isopropoxymagnesium, butoxymagnesium, n-octoxymagnesium, and 2-ethylhexoxymagnesium; dialkoxymagnesiums such as dimethoxymagnesium, diethoxymagnesium, dipropoxymagnesium, dibutoxymagnesium, ethoxymethoxymagnesium, ethoxypropoxymagnesium, and butoxyethoxymagnesium; and aryloxymagnesiums such as phenoxymagnesium and dimethylphenoxymagnesium.

The above-mentioned electron donor compound is generally referred to as an "internal electron donor compound". In the present invention, the internal electron donor compound is preferably a compound having an ester moiety represented by Chemical Formula (I).

[Chemical Formula 1]

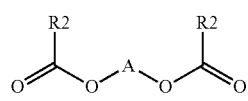

(I)

In Chemical Formula (I), R1 is independently a hydrogen atom or a hydrocarbon group having 1 to 15 carbon atoms. The hydrocarbon group may have a heteroatom such as halogen, P, S, N, O, or Si, and may form a ring. R2 is defined similarly to R1, but R2 and R1 do not need to have the same structure. Further, R1 and R2 may be linked to form a ring.

A is a divalent crosslinking group. The chain length between the crosslinking bonds is preferably 1 to 10 atoms. When A has a cyclic structure, the chain length refers to the number of atoms of the shortest sequence between the oxygen atoms to which A is bonded. A is preferably represented by —$(ZR^3{}_m)_n$—. Z is preferably C, Si, Ge, O, N, S, or P. One or more $R^3$'s are each independently hydrogen or a hydrocarbon group having 1 to 20 carbon atoms, and may contain the above-mentioned heteroatom, and a plurality of $R^3$'s may be fused to form one or more rings. m is a number corresponding to the valence of Z, and n is an integer of 1 to 10. For example, $R^3$ can form an aromatic ring, a heterocyclic ring, or an alicyclic ring together with Z. When —$(ZR^3{}_m)_n$— contains O, S, and N, these atoms are not directly bonded to the oxygen atoms of Chemical Formula (I).

In the present invention, it is more preferable to use a carbamate-based compound as the internal electron donor compound. The carbamate-based compound is a compound having a carbamic acid ester skeleton, and is represented by Chemical Formula (II).

[Chemical Formula 2]

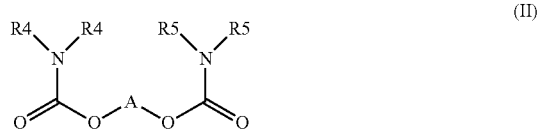

(II)

In Chemical Formula (II), R4's are independently a hydrogen atom or a hydrocarbon group having 1 to 15 carbon atoms. The hydrocarbon group may have a heteroatom such as halogen, P, S, N, O, or Si, and the two R4's may be linked to form a ring. R5 is defined similarly to R4, but R4 and R5 do not need to have the same structure.

A is defined as described above, and Z is preferably C or Si, and more preferably C. In particular, compounds having the following combinations are preferred.

A: a divalent aromatic group that may have a substituent. Examples of the aromatic group include a phenylene group and a naphthylene group. Examples of the substituent include linear or branched alkyl groups having 1 to 5 carbon atoms, such as a methyl group, an ethyl group, a propyl group, a butyl group, and a pentyl group.

R4 and R5: linear or branched alkyl groups having 1 to 5 carbon atoms, such as a methyl group, an ethyl group, a propyl group, a butyl group, and a pentyl group.

Specifically, compounds described in US 2015-0266981 A can be used as the compounds defined by Chemical Formula (II).

(2) Organoaluminum Compound (Component (b))

Examples of the organoaluminum compound include the following compounds:

trialkylaluminums such as triethylaluminum and tributylaluminum;

trialkenyl aluminums such as triisoprenyl aluminum;

dialkylaluminum alkoxides such as diethylaluminum ethoxide and dibutylaluminum butoxide;

alkyl aluminum sesquialkoxides such as ethyl aluminum sesquiethoxide and butyl aluminum sesquibutoxide;

partially halogenated alkylaluminums such as ethylaluminum dichloride, propylaluminum dichloride, butylaluminum dibromide, diethylaluminum chloride, dipropylaluminum chloride, and dibutylaluminum chloride;

partially hydrogenated alkyl aluminums such as dialkylaluminum hydrides including diethylaluminum hydride and dibutylaluminum hydride;

alkyl aluminum dihydrides including ethyl aluminum dihydride and propyl aluminum dihydride; and partially alkoxylated and halogenated alkylaluminums such as ethylaluminum ethoxychloride, butylaluminum butoxychloride, and ethylaluminum ethoxybromide.

(3) Electron Donor Compound (Component (c))

The electron donor compound of the component (c) is also referred to as an "external electron donor compound". As the external electron donor compound, an organosilicon compound is preferable, and specific examples thereof include the following compounds:

trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, dicyclopentyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, thexyltrimethoxysilane, n-butyltriethoxysilane, iso-butyltriethoxysilane, phenyltriethoxysilane, γ-aminopropyltriethoxysilane, chlortriethoxysilane, ethyltriisopropoxysilane, vinyltributoxysilane, cyclohexyltrimethoxysilane, cyclohexyltriethoxysilane, 2-norbornane trimethoxysilane, 2-norbornane triethoxysilane, 2-norbornane methyldimethoxysilane, ethyl silicate, butyl silicate, trimethylphenoxysilane, methyltriallyloxysilane, vinyltris(β-methoxyethoxysilane), vinyltriacetoxysilane, dimethyltetraethoxydisiloxane, methyl(3,3,3-trifluoro-n-propyl)dimethoxysilane, cyclohexylethyldimethoxysilane, cyclopentyl-t-butoxydimethoxysilane, diisobutyldimethoxysilane, isobutylisopropyldimethoxysilane, n-propyltrimethoxysilane, di-n-propyldimethoxysilane, thexyltrimethoxysilane, t-butylethyldimethoxysilane, t-butylpropyldimethoxysilane, t-butyl-t-butoxydimethoxysilane, isobutyltrimethoxysilane, cyclohexylisobutyldimethoxysilane, di-sec-butyldimethoxysilane, isobutylmethyldimethoxysilane, bis(decahydroisoquinoline-2-yl)dimethoxysilane, diethylaminotriethoxysilane, dicyclopentyl-bis(ethylamino)silane, tetraethoxysilane, tetramethoxysilane, and isobutyltriethoxysilane.

(4) Composition Ratio

The composition ratio among the components (a) to (c) is not limited, but the composition ratio between the component (a) and the component (b) is adjusted so that the Al/Ti molar ratio is preferably 10 to 1000 and more preferably 30 to 600; when the component (c) contains silicon, the composition ratio between the component (a) and the component (c) is adjusted so that the Si/Al molar ratio is preferably 0.01 to 1.5 and more preferably 0.05 to 1.0.

(5) Polymerization

One or more monomers are brought into contact with the catalyst prepared as described above to perform polymerization. For this polymerization, pre-polymerization may be performed using the catalyst first as described above.

2-3. Method of Separately Preparing Component (A1) and Component (A2) and Mixing Both (Method 3)

In Method 3, the component (A1) and the component (A2) prepared by an arbitrary method, and other components as necessary are mixed. The order of addition of each component is not limited. The mixing method is also not particularly limited, and examples thereof include a method using a mixer such as a Henschel mixer or a tumbler mixer. The mixture obtained by mixing may be melt-kneaded and further pelletized. In the present invention, it is preferable to include a process of pelletizing by melt-kneading from the viewpoint of uniformly dispersing the high molecular weight component. The melt-kneading method is not particularly limited, and for example, a melt-kneading apparatus such as a single screw extruder, a twin screw extruder, a Banbury mixer, a kneader, or a roll mill can be used.

3. Application

The composition of the present invention, which contains the component (A1) having an ultrahigh molecular weight, has high melt tension and die swell. Therefore, the composition of the present invention is useful for applications of an extruded article (general sheet, foamed sheet, blow molded article, etc.) and an injection molded article. In addition, the composition of the present invention can also be a composition in which the component (A1) having crystallinity and also having a property of being difficult to melt is used similarly to an organic filler. The composition of the present invention can also be used as a master batch and combined with another polyolefin to form a secondary composition. The secondary composition also preferably has the above-described MFR and melt tension. In the secondary composition, the blending weight ratio between the composition of the present invention and another polyolefin is not limited, but may be 100. (10 to 100). As another polyolefin, a known polyolefin such as a propylene-based polymer (propylene homopolymer, propylene copolymer (RACO), polymerization mixture (HECO)) other than the component (A2), or an ethylene-based polymer can be used.

(1) Foamable Composition

The composition of the present invention is useful as a foamable composition. Hereinafter, foaming agents that can be used in the foamable composition will be described. As the foaming agent, either a decomposition type foaming agent or a solvent type foaming agent can be used. The decomposition type foaming agent is a compound that decomposes under cylinder temperature conditions of a molding machine to generate gases such as carbon dioxide gas or nitrogen gas. As the decomposition type foaming agent, either an inorganic foaming agent or an organic foaming agent can be used. Further, a known foaming aid such as an organic acid that promotes generation of gas may be used in combination.

Examples of the inorganic decomposition type foaming agent include sodium hydrogen carbonate, sodium carbonate, ammonium hydrogen carbonate, ammonium carbonate, ammonium nitrite, citric acid, sodium citrate, and the like. Examples of the organic decomposition type foaming agent include N-nitroso compounds such as N,N'-dinitrosoterephthalamide and N,N'-dinitrosopentamethylenetetramine; azo compounds such as azodicarbonamide, azobisisobutyronitrile, azocyclohexylnitrile, azodiaminobenzene, and barium azodicarboxylate; sulfonyl hydrazide compounds such as benzenesulfonyl hydrazide, toluenesulfonyl hydrazide, p,p'-oxybis(benzenesulphenylhydrazide), and diphenylsulfone-3,3'-disulfonyl hydrazide; and azide compounds such as calcium azide, 4,4'-diphenyldisulfonyl azide, and p-toluenesulfonyl azide.

Among the above foaming agents, a carbonate or a hydrogencarbonate such as sodium hydrogencarbonate is preferable when an inorganic decomposition type foaming agent is used from the viewpoint of having little influence on the environment, being safe, and further stabilizing foamed cells, and in this case, an organic carboxylic acid may be used in combination as a foaming aid.

The solvent type foaming agent is a substance that is injected into a composition containing no foaming agent from a cylinder portion of a molding machine and evaporate in a mold to function as a foaming agent. Low-boiling-point aliphatic hydrocarbons such as propane, butane, neopentane, heptane, isoheptane, isohexane, and hexane, low-boiling-point fluorine-containing hydrocarbons represented by fluorocarbon gas, and the like can be used. Alternatively, an inert gas such as nitrogen or carbon dioxide may be pressurized to be used as a foaming agent of a supercritical fluid.

The foaming agent used in the foamable composition can be added in a form of a foaming agent master batch using a polyolefin as a carrier. Examples of the polyolefin include polypropylene, polyethylene, and polystyrene. The carrier contained in the masterbatch corresponds to the above-described other components. The content of the decomposition type foaming agent or the solvent type foaming agent contained in the foaming agent masterbatch is usually 5 to 50 wt % and preferably 10 to 40 wt %, and a commercially available product can be used as it is.

The addition amount of the foaming agent is usually 1 to 10 phr, preferably 2 to 6 phr, and more preferably 2 to 4 phr, with respect to the composition of the present invention. Further, within the above range, the optimum amount is selected in consideration of the amount of gas to be generated, the foaming ratio, and the like. The foaming ratio is preferably 1.5 or more, more preferably 2.0 or more, and still more preferably 2.5 or more. From a foamable composition within the above range, a foam having uniform cell diameters and uniformly dispersed cells is obtained.

(2) Use as Masterbatch

As described above, the composition of the present invention can also be used as a master batch and combined with a polyolefin other than the components (A1) and (A2) to form a secondary composition. As the polyolefin other than the components (A1) and (A2), any polyolefin can be used.

EXAMPLES

Example 1

1) Polypropylene-Based Resin Composition

Into a 300 mL 4-necked round-bottom flask purged with nitrogen, 45 mL of toluene and 10.0 g of fine spherical $Mg(OC_2H_5)_2$ were introduced at 5° C. While stirring, 28.7 ml of titanium tetrachloride was added dropwise over 10 minutes, and 11.3 mmol of 5(tertiary butyl)-3-methyl-1,2-phenylene bis(diethylcarbamate) (hereinafter, also referred to as compound a) was added thereto. The temperature was raised to 110° C. and held for 120 minutes. Stirring was then stopped, the solid product was allowed to settle, and the supernatant liquid was sucked out. Thereafter, the solid product was washed 4 times with toluene (75 mL) at 90° C.

To the washed solid, 50 ml of toluene was added, into which 21 ml of titanium tetrachloride was then added, the temperature was raised to 100° C., and the mixture was stirred for 90 minutes. Thereafter, stirring was stopped, the solid product was allowed to settle, and the supernatant liquid was sucked out. Then, the solid product was washed 6 times with heptane (75 mL) at 40° C. The washed solid was dried under reduced pressure to obtain 7.6 g of a solid catalyst component (a). The solid catalyst component contained 14.3 wt % of the compound a, 14.0 wt % of Mg, and 4.0 wt % of Ti.

[Pre-Stage Polymerization]

The inside of a reactor of an autoclave with a stirrer and an internal volume of 20 μL was sufficiently vacuum-dried and replaced with nitrogen. 59.3 mg of the solid catalyst component containing the compound a prepared above was added, and triethylaluminum (TEAL) and dicyclopentyldimethoxysilane (DCPMS) were also added in such amounts that the Al/Ti molar ratio was 150 and the Si/Al molar ratio was 1.0. Subsequently, 5.6 kg of liquefied propylene was added into the reactor, and polymerization was performed at 40° C. for 10 minutes while ethylene gas was continuously supplied during polymerization, thus adjusting the ethylene partial pressure to be constant. The propylene-ethylene copolymer (component (A1)) of the present invention was obtained by adjusting the polymerization pressure. Thereafter, the unreacted monomers were purged, and the inside of the reaction vessel was sufficiently replaced with nitrogen.

[Post-Stage Polymerization]

Subsequently, TEAL and DCPMS were added to the reactor in such amounts that the Al/Ti molar ratio was 400 and the Si/Al molar ratio was 0.05. Into the reactor, 5.6 kg of liquefied propylene and hydrogen gas were added so that the hydrogen concentration in the liquid propylene was 0.7 mol %, the temperature of the autoclave was raised to 70° C., and polymerization (polymerization of propylene) was performed for 180 minutes. After completion of the polymerization reaction, the unreacted monomer was purged to obtain 4.6 kg of a powdery composition. The composition is a polymerization composition obtained by polymerization blending of the propylene-ethylene copolymer (component (A1)) and polypropylene (component (A2)) of the present invention. The physical properties and the like of the composition are shown in Table 1. However, the intrinsic viscosity, the content percentage of ethylene-derived units, and the melting point of the propylene-ethylene (co)polymer of the present invention are the results of analyzing a polymer obtained by performing only the pre-stage polymerization under the same conditions. In addition, the proportion of the propylene-ethylene (co)polymer of the present invention in the composition was determined by the activity ratio with respect to the pre-stage polymerization.

To the powdery polymerization composition obtained above, 0.2 phr of B225 manufactured by BASF as an antioxidant and 0.1 phr of calcium stearate manufactured by Tannan Kagaku Kogyo Co., Ltd. as a neutralizing agent were added, which was then stirred with a Henschel mixer for 1 minute to obtain a mixture. Subsequently, the mixture was melt-kneaded using an extruder (manufactured by Technovel Corporation, screw diameter: 15 mm, co-rotating twin screw extruder) having a screw temperature set to 230° C. Then, the melted mixture was discharged from the extruder, cooled to form strands, which were then cut to obtain a pellet-shaped composition (A).

2) Formation of Foam

To the pellet-shaped composition (A) obtained as described above, 4 phr of CELLMIC MB3064 manufactured by Sankyo Kasei Co., Ltd. was added as a foaming agent, which was then dry-blended to obtain a foamable composition. Subsequently, using the foamable composition, foamed strands were formed under the following conditions, and the foam obtained was evaluated.

Extruder: single screw extruder TP-15 manufactured by Thermo Plastics Industries, Co., Ltd.
Die portion shape: strand die
Die portion dimension: 2 mmφ
Extrusion amount: 500 g/h
Screw shape: full flight screw
Screw rotation speed: 40 rpm
Cylinder set temperature: 210° C.
Die portion set temperature: 180° C.

To a pellet-shaped composition (A) similarly obtained in 1), 6 phr of CELLMIC MB3064 manufactured by Sankyo Kasei Co., Ltd. was added as a foaming agent, which was then dry-blended to obtain a foamable composition. Using the foamable composition, a foam was obtained and evaluated as described above.

A pellet-shaped composition (A) similarly obtained in 1) was hot press-molded at a temperature of 230° C. to obtain a non-foamed sheet (thickness: 500 μm). This non-foamed sheet was cut to prepare a test piece, and the stiffness was measured. These results are shown in Table 1.

Examples 2 to 5

Polymerizations were each performed similarly to Example 1 except that the ethylene partial pressure in the pre-stage polymerization and the hydrogen concentration and the polymerization time in the post-stage polymerization were changed, thus obtaining compositions (A) shown in Table 1. However, in Example 4, pre-stage polymerization was performed with the ethylene partial pressure set to zero, that is, without supplying ethylene gas. Using the above compositions (A), foams and non-foamed sheets were obtained in the same manner as in Example 1 and evaluated. These results are shown in Table 1.

Comparative Example 1

Polymerization was performed similarly to Example 4 except that the Al/Ti molar ratio and the Si/Al molar ratio were changed to 500 and 0.1 respectively in the pre-stage polymerization, and that the hydrogen concentration and the polymerization time in the post-stage polymerization were adjusted, thus obtaining a composition (A) shown in Table 1. Here, the Al/Ti molar ratio was changed by increasing the amount of TEAL used.

Comparative Example 2

A solid catalyst, a solid catalyst for polymerization, in which Ti and diisobutylphthalate as an internal electron donor compound were supported on $MgCl_2$ was prepared by a method described in example 1 of EP 674991 B. Subsequently, the above solid catalyst was brought into contact with TEAL and cyclohexylmethyldiethoxysilane (CHMMS) and left at −5° C. for 5 minutes in an amount such that the weight ratio of TEAL to the solid catalyst was 8, and the weight ratio of TEAL/CHMMS was 6.5. The catalyst system obtained was held in suspension in liquid propylene at 20° C. for 5 minutes, thereby performing pre-polymerization. The pre-polymerization product obtained was introduced into a polymerization reactor, into which hydrogen and propylene were then fed, and the polymerization temperature and hydrogen concentration were adjusted to 75° C. and 0.04 mol % respectively, thereby producing a propylene homopolymer. The polymer obtained was blended with 0.2 wt % of B225 manufactured by BASF SE as an antioxidant and 0.05 wt % of calcium stearate manufactured by Tannan Kagaku Kogyo Co., Ltd. as a neutralizing agent, and the blend was stirred and mixed with a Henschel mixer for 1 minute, and then extruded with a single screw extruder (NVC manufactured by Nakatani Machine Co., Ltd.) having a screw diameter of 50 mm at a cylinder temperature of 230° C., and the strands were cooled in water and then cut with a pelletizer to obtain a pellet-shaped polypropylene-based resin composition (composition (A) containing only the component (A2)).

Comparative Example 3

A solid catalyst component was prepared according to a preparation method described in an example of JP 2011-500907 A. Specifically, the solid catalyst component was prepared as follows.

Into a 500 mL 4-necked round-bottom flask purged with nitrogen, 250 mL of $TiCl_4$ was introduced at 0° C. While stirring, 10.0 g of fine spherical $MgCl_2.1.8C_2H_5OH$ and 9.1 mmol of diethyl-2,3-(diisopropyl)succinate were added. The $MgCl_2.1.8C_2H_5OH$ was produced according to a method described in example 2 of U.S. Pat. No. 4,399,054 B but changing the number of revolutions from 10,000 rpm to 3000 rpm. The temperature was raised to 100° C. and held for 120 minutes. Stirring was then stopped, the solid product was allowed to settle, and the supernatant liquid was sucked out. Then, the following operation was repeated twice to obtain a solid catalyst.

To the solid product, 250 mL of fresh $TiCl_4$ was added, the mixture was reacted at 120° C. for 60 min, and the supernatant liquid was sucked out. The solid was washed 6 times with anhydrous hexane (6×100 mL) at 60° C.

The solid catalyst was brought into contact with TEAL and DCPMS and left at room temperature for 5 minutes in an amount such that the weight ratio of TEAL to the solid catalyst was 18 and the weight ratio of TEAL/DCPMS was 10. The catalyst system obtained was held in suspension in liquid propylene at 20° C. for 5 minutes, thereby performing pre-polymerization. The pre-polymerization product obtained was introduced into a first-stage polymerization reactor to obtain a propylene homopolymer, from which the unreacted monomer was then purged, and subsequently introduced into a second-stage polymerization reactor to obtain a copolymer (ethylene-propylene copolymer). During the polymerization, the temperature and pressure were adjusted, and hydrogen was used as a molecular weight regulator. As for the polymerization temperature and the proportion of the reactants, the polymerization temperature and the hydrogen concentration were 70° C. and 0.90 mol % respectively in the first-stage reactor, and the polymerization temperature, the hydrogen concentration, and C2/(C2+C3) were 80° C., 0.01 mol %, and 0.25 molar ratio respectively in the second-stage reactor. In addition, the residence times of the first stage and the second stage were adjusted so that the amount of the copolymer component was 30 wt %.

Using the propylene-ethylene block copolymer obtained, a pellet-shaped polypropylene-based resin composition (composition (A)) was obtained similarly to Comparative Example 2. The MFR and content percentage of ethylene-derived units of the composition (A) obtained were 10 g/10 min and 9.0 wt % respectively, and the intrinsic viscosity of a polymer that was obtained by a method described later and was soluble in xylene at 25° C. (corresponding to the component (A1)) was 7 dl/g.

Using the compositions (A) obtained in Comparative Examples, foams and non-foamed sheets were obtained in the same manner as in Example 1 and evaluated. These results are shown in Table 1. For the compositions of Comparative Examples 1 and 2, attempts were made to form foams, but foams sufficient for evaluation could not be obtained.

Example 6

A composition (composition (A+B)) was prepared by dry-blending 50 wt % of the composition (A) prepared in Example 2, which contained no foaming agent, and 50 wt % of polypropylene (PX600N, manufactured by SunAllomer Ltd.), and melt-kneading the blend using an extruder (manufactured by Technovel Corporation, screw diameter: 15 mm, co-rotating twin screw extruder) having a screw temperature set to 230° C. To the above composition, 4 phr of CELLMIC MB3064 manufactured by Sankyo Kasei Co., Ltd. was added as a foaming agent to prepare a foamable composition. In Table 2, the composition (A) prepared in Example 2 is represented by a component (A), and the polypropylene is represented by a component (B). Using the above foamable composition, a foam and a non-foamed sheet were produced in the same manner as in Example 1 and evaluated. In addition, a foam in which the amount of the foaming agent was changed to 6 phr was produced and evaluated. These results are shown in Table 2.

Example 7

A foam and a non-foamed sheet were produced in the same manner as in Example 6 except that the proportion of the component (A) and the component (B) was changed as shown in Table 2, and evaluated. These results are shown in Table 2.

Example 8

A foam and a non-foamed sheet were produced in the same manner as in Example 6 except that the component (A) was changed to that prepared in Example 3, and evaluated. These results are shown in Table 2.

Example 9

A foam and a non-foamed sheet were produced in the same manner as in Example 6 except that the component (A) was changed to that prepared in Example 1 and the component (B) was changed to the composition (A) of Comparative Example 3, and evaluated. These results are shown in Table 2.

TABLE 1

|  |  |  | Example 1 | Example 2 | Example 3 | Example 4 | Example 5 | Comparative Example 1 | Comparative Example 2 | Comparative Example 3 |
|---|---|---|---|---|---|---|---|---|---|---|
| Foam | Foaming ratio | Foaming agent (4 phr) | 2.9 | 4.3 | 3.6 | 3.5 | 3.6 | 2.2 | 2.1 | 3.4 |
|  |  | Foaming agent (6 phr) | 3.6 | 5.1 | 5.2 | 5.5 | 4.9 | 2.6 | 1.3 | 3.9 |
|  | Appearance | — | B | A | A | C | A | Impossible to evaluate | Impossible to evaluate | B |
|  | Closed cell property | — | B | A | A | A | A | Impossible to evaluate | Impossible to evaluate | C |
| Non-foamed sheet | Stiffness | MPa | 1450 | 1530 | 1470 | 1560 | 1510 | 1440 | 1160 | 940 |
| Component (A1) (High molecular weight component) | Content in composition (A) | wt % | 3.1 | 5.0 | 7.8 | 2.1 | 3.9 | 0.6 | 0 | 30 |
|  | Intrinsic viscosity | dl/g | 28 | 31 | 35 | 21 | 24 | 19 | — | 7 |
|  | Content percentage of ethylene-derived units | wt % | 6.6 | 10 | 16 | 0 | 6.6 | 0 | — | 30 |
|  | Melting point | ° C. | 154 | 140 | 134 | 169 | 154 | 168 | — | Impossible to detect |
| Component (A2) | MFR | g/10 min | 18 | 30 | 30 | 6.7 | 30 | 0.7 | 3.0 | 105 |
|  | Content percentage of ethylene-derived units | wt % | 0 | 0 | 0 | 0 | 0 | 0 | 0 | 0 |
| Composition (A) | MFR | g/10 min | 2.6 | 6.0 | 5.0 | 3.8 | 15 | 0.9 | 3.0 | 10 |
|  | Melt tension (MT) | g-weight | 7.9 | 14.1 | 20.2 | 4.4 | 4.8 | 8.0 | 2.6 | 2.2 |
|  | Product of log (MFR + 1) and log (MT) | — | 0.50 | 0.97 | 1.02 | 0.44 | 0.82 | 0.25 | 0.25 | 0.36 |
|  | XI | wt % | 99.0 | 98.4 | 97.4 | 99.1 | 98.5 | 99.3 | 97.7 | 78.0 |

TABLE 2

|  |  |  | Example 6 (A) of Example 2/(B) = 50/50 | Example 7 (A) of Example 2/(B) = 75/25 | Example 8 (A) of Example 3/(B) = 50/50 | Example 9 (A) of Example 1/(B) = 50/50 |
|---|---|---|---|---|---|---|
| Foam | Foaming ratio | Foaming agent (4 phr) | 3.3 | 3.7 | 2.9 | 3.5 |
|  |  | Foaming agent (6 phr) | 4.1 | 4.2 | 4.6 | 4.9 |
|  | Appearance | — | A | A | A | A |
|  | Closed cell property | — | A | A | A | A |
| Non-foamed sheet | Stiffness | MPa | 1570 | 1570 | 1410 | 1190 |
| Composition (A + B) | MFR | g/10 min | 6.4 | 6.2 | 5.8 | 4.4 |
|  | Melt tension (MT) | g-weight | 6.7 | 10.1 | 7.7 | 5.5 |
|  | Product of log (MFR +1) and log (MT) | — | 0.72 | 0.86 | 0.74 | 0.54 |
| Component (A) | MFR | g/10 min | 6.0 | 6.0 | 5.0 | 2.6 |
|  | Content in composition (A + B) | wt % | 50 | 75 | 50 | 50 |
| Component (B) | MFR | g/10 min | 7.0 | 7.0 | 7.0 | 10 |
|  | Content percentage of ethylene-derived units | wt % | 0 | 0 | 0 | 9.0 |
|  | Content in composition (A + B) | wt % | 50 | 25 | 50 | 50 |

As shown in Tables 1 and 2, it is apparent that the foams obtained from the composition of the present invention are excellent in appearance and closed cell property.

The evaluation was carried out as follows.

[Content Percentage of Ethylene-Derived Units]

A propylene (co)polymer sample was hot-pressed at 230° C. to prepare a sheet having a thickness of 0.4 mm. By Fourier transform infrared spectroscopy (FT-IR), an IR spectrum of the sample to air background was collected to determine the content percentage (wt %) of the ethylene-derived units of the propylene (co)polymer using a peak area of 760 cm to 690 cm$^{-1}$ after correcting the thickness of the sheet. The data collection parameters were as follows.
Apodization: Cosine
Resolution: 2 cm$^{-1}$

[XI of Polymer]

While stirring, 0.5 to 1.5 g of a polymer was dissolved in 250 mL of xylene at 135° C. After 30 min, the solution was cooled to 25° C. while stirring and then allowed to stand for 30 min. The precipitate was filtered through filter paper, the solution was evaporated in a stream of nitrogen, and the residue was dried at 80° C. under vacuum until the residue gained a constant weight. The wt % of the polymer soluble in xylene at 25° C. was thus calculated. The amount of a xylene insoluble component (wt % of polymer insoluble in xylene at 25° C., XI) is determined by 100–"wt % of soluble polymer" and is considered to be the amount of a crystalline component in the polymer.

[Intrinsic Viscosity of Polymer]

A sample of a propylene (co)polymer was dissolved in tetralin at 135° C. to obtain a solution having a concentration of 0.01 to 0.02 wt %. Using the solution, the intrinsic viscosity was measured using a capillary automatic viscosity measuring apparatus (SS-780-H1, manufactured by Shibayama Scientific Co., Ltd.).

[Melting Point of Polymer]

The melting point of a polymer was measured by second scanning defined as described above using a Diamond DSC manufactured by PerkinElmer, Inc.

[MFR]

For a powdery polymer or a polymerization composition, 0.05 g of H-BHT manufactured by Honshu Chemical Industry Co., Ltd. was added to 5 g of the sample, which was then homogenized by dry blending, and then measurement was performed under conditions of a temperature of 230° C. and a load of 2.16 kg in accordance with JIS K7210-1. For melt-kneaded pellets, measurement was performed under the conditions of a temperature of 230° C. and a load of 2.16 kg in accordance with JIS K7210-1.

[Melt Tension]

Using a capillary rheometer (Capilograph 1D manufactured by Toyo Seiki Seisaku-sho, Ltd.) equipped with a cylindrical orifice having a length of 8.0 mm and a diameter of 2.095 mm and having a flat upper surface, a resin composition was melted at a temperature of 200° C. The melted resin composition was discharged from the orifice at a resin extrusion rate of 15 mm/min to form a strand. The strand was taken up using a rotating take-up device at a take-up speed of 6.5 μm/min while the melt tension (unit: g-weight) was measured.

[Appearance of Foam]

The appearance of a foamed strand that had been foamed at a foaming ratio of 3.0 or more and 3.4 or less was evaluated according to the following criteria.
 A: The surface is smooth, and a strand is straight.
 B: The surface is slightly uneven or wavy.
 C: The surface is uneven, and a strand has waviness.

[Closed Cell Property]

A foamed strand that had been foamed at a foaming ratio of 3.0 or more and 3.4 or less was cut out to a piece having a length of 4 cm with a razor blade, one side of the piece was immersed in an ethanol solution of a pigment for 30 seconds, and the closed cell property was evaluated from a distance (coloring maximum distance) at which ethanol most penetrated the inside from the cut section.
 A: Coloring maximum distance is 2 mm or less.
 B: Coloring maximum distance is more than 2 mm and 20 mm or less.
 C: Coloring maximum distance is more than 20 mm.

[Stiffness]

A non-foamed sheet was punched into a test piece having a length of 2.75 inches and a width of 1.5 inches to prepare five test pieces.

The stiffness of each test piece was measured according to JIS P8125 using V-5 stiffness tester (model: 150-B) manufactured by Taber Instrument Corporation at a room temperature of 23° C. The measurement conditions for the measurement were as follows.

Measurement range: 50-500
Range weight: 500 units
Warpage angle: 15°
Measurement span: 5 cm
Scale magnification: 5-fold
Retention time: 1 minute
Measurement temperature: 23° C.

The stiffness was determined by reading values at right and left warpage angles of 15° for each test piece and averaging the values. Then, the stiffness of the non-foamed sheet was determined by the following formula.

$$E = 9.83 \times T_{su}/t^3$$

(E: stiffness of sheet [MPa], $T_{su}$: average value of stiffness [gf·cm], t: thickness of test piece [mm])

As the stiffness value is larger, the rigidity is higher.

It is apparent that Examples, in which the polypropylene-based resin compositions contain 0.1 to 10 wt % of the component (A1) having a intrinsic viscosity of more than 20 dl/g, as measured in a tetralin solvent at 135° C., give high rigidity and excellent foams.

The invention claimed is:

1. A polypropylene-based resin composition containing: a component (A1) being a propylene-ethylene a copolymer wherein the component (A1) has an intrinsic viscosity of 23 dl/g or more, as measured in a tetralin solvent at 135° C., and a content of the ethylene of 3 to 30 wt %,
 a component (A2) being a polymer selected from a group consisting of
  (A2-1) a propylene homopolymer,
  (A2-2) a random copolymer of propylene and an α-olefin having 2 or 4 to 8 carbon atoms,
  (A2-3) a block copolymer of propylene and an α-olefin having 2 or 4 to 8 carbon atoms, and
 a combination of the (A2-1), (A2-2), and (A2-3),
 and having a content of the component (A1) of 0.1 to 10 wt % and a content of the component (A2) of 99.9 to 90 wt % based on a total amount of the component (A1) and the component (A2), and
 the component (A2) having a melt flow rate (MFR) (230° C., load: 2.16 kg) of 1 to 500 g/10 min.

2. The resin composition according to claim 1, wherein the component (A1) has a melting point determined using a differential scanning calorimeter (DSC) at a heating rate of 10° C./min, and the melting point, Tm (° C.), of the propylene-ethylene copolymer and the content of the ethylene in the propylene-ethylene copolymer, C2 (wt %), satisfy formula (1) below:

$$Tm \geq -3.4 \times C2 + 162 \qquad (1).$$

3. A method for producing the resin composition according to claim 1, comprising the polymerization of a corresponding monomer using a catalyst to prepare the component (A1),
 wherein the catalyst contains
  (a) a solid catalyst containing magnesium, titanium, halogen, and an electron donor compound as essential components;
  (b) an organoaluminum compound; and
  (c) an external electron donor compound as necessary.

4. The resin composition according to claim 1, the resin composition being obtained by a production method including polymerizing one or more monomers corresponding to the components (A1) and (A2) in two or more polymerization stages carried out sequentially or continuously.

5. The resin composition according to claim 4, wherein a process of polymerizing a monomer corresponding to the component (A1) includes a pre-polymerization process.

6. The resin composition according to claim 1, the resin composition having an MFR (230° C., load: 2.16 kg) of 1 to 20 g/10 min.

7. The resin composition according to claim 1, the resin composition having a melt tension (200° C., diameter: 2.095 mm) of 2.5 to 30 g-weight.

8. A foam formed from the resin composition according to claim 1.

9. A polypropylene-based resin composition containing: a component (A1) being a propylene-ethylene copolymer having up to 30 wt % ethylene, having an intrinsic viscosity of more than 20 dl/g, as measured in a tetralin solvent at 135° C., and having a melting point determined using a differential scanning calorimeter (DSC) at a heating rate of 10° C./min, and the melting point, Tm (° C.), of the propylene-ethylene copolymer and the content of the ethylene in the propylene-ethylene copolymer, C2 (wt %), satisfy formula (1) below:

$$Tm \geq -3.4 \times C2 + 162 \qquad (1);$$

and
    a component (A2) being a polymer selected from a group consisting of
      (A2-1) a propylene homopolymer,
      (A2-2) a random copolymer of propylene and an α-olefin having 2 or 4 to 8 carbon atoms,
      (A2-3) a block copolymer of propylene and an α-olefin having 2 or 4 to 8 carbon atoms, and
    a combination of the (A2-1), (A2-2), and (A2-3),
    and having a content of the component (A1) of 0.1 to 10 wt % and a content of the component (A2) of 99.9 to 90 wt % based on a total amount of the component (A1) and the component (A2), and
    the component (A2) having a melt flow rate (MFR) (230° C., load: 2.16 kg) of 1 to 500 g/10 min.

\* \* \* \* \*